United States Patent Office 3,122,549
Patented Feb. 25, 1964

3,122,549
NOVEL ORGANIC SULFONIC ACIDS HAVING DITHIOCARBAMIC ACID ESTER AND THIOUREA OR THIOSEMICARBAZIDE GROUPS AND THEIR SALTS AND PREPARATION THEREOF
Wolfgang Gündel, Dusseldorf-Oberkassel, Germany, assignor to Dehydag Deutsche Hydrierwerke G.m.b.H., Dusseldorf, Germany, a corporation of Germany
No Drawing. Filed June 20, 1962, Ser. No. 203,701
Claims priority, application Germany July 8, 1961
13 Claims. (Cl. 260—268)

The invention relates to novel compounds which contain at least one

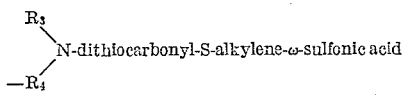

group wherein $R_3$ is a hydrocarbon radical, $R_4$ is an alkylene radical, and at least one thiourea or thiosemicarbazide group attached to the said dithiocarbonyl grouping through the alkylene radical $R_4$. The invention also relates to a novel process for the preparation of the said novel compounds.

The novel compounds of the invention form difficultly soluble precipitates of copper and are useful in copper electroplating baths since they possess leveling and brightening properties.

It is an object of the invention to provide novel compounds which contain at least one

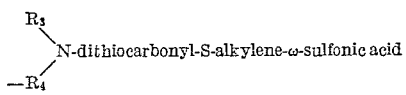

grouping and at least one thiourea or thiosemicarbazide group attached through the alkylene radical $R_4$ to the dithiocarbonyl group.

It is another object of the invention to provide a novel process for the preparation of compounds which contain at least one

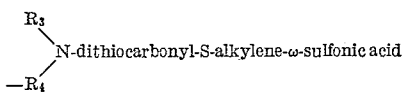

grouping and at least one thiourea or thiosemicarbazide group attached through the alkylene radical $R_4$ to the dithiocarbonyl group.

These and other objects and advantages of the invention will become obvious from the following detailed description.

The novel compounds of the invention in their simplest form have a formula selected from the group consisting of:

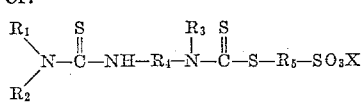

and

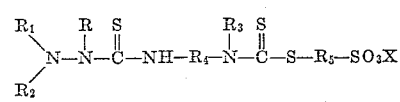

wherein X is selected from the group consisting of hydrogen, an alkali metal and a salt forming organic base, R, $R_1$, and $R_2$ are selected from the group consisting of hydrogen, aliphatic cycloaliphatic, araliphatic and aromatic radicals and $R_1$ and $R_2$ when taken with the nitrogen atom form a heterocyclic radical, $R_3$ is selected from the group consisting of aliphatic, cycloaliphatic and araliphatic radicals, $R_4$ is an alkylene radical having 2 to 18 carbon atoms, and $R_5$ is an alkylene radical having 2 to 4 carbon atoms. In the more complex forms of the invention, at least one of the radicals $R_1$, $R_2$ and $R_3$ contains an additional grouping selected from the group consisting of thiourea, thiosemicarbazide and dithiocarbonyl-S-alkylene-ω-sulfonic acid groups. The terms aliphatic, cycloaliphatic and araliphatic are intended to include radicals containing hetero atoms or hetero atom groups.

The novel process of the invention comprises reacting a polyamine lacking tertiary amino groups having the formula $$NH_2—R_4—NH—R_3$$

wherein $R_3$ is an organic radical of the above definition and $R_4$ is an alkylene radical having 2 to 18 carbon atoms in an aqueous medium with one mol of carbon disulfide and one mol of an alkali for each mol of amino groups to form a poly-dithiocarbamate having the formula

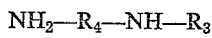

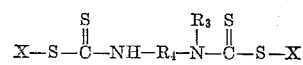

wherein $R_3$ and $R_4$ have the above definitions and X is a metal, reacting the said poly-dithiocarbamate with a member of the group consisting of a salt of a halo-alkane-ω-sulfonic acid having 2 to 4 carbon atoms and a 1,3-alkane sultone and a 1,4-alkane sultone having up to 4 carbon atoms to form alkane poly-dithiocarbamyl-S-alkylene sulfonic acid salts having the formula

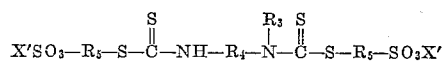

wherein $R_4$, $R_3$ and X have the above definitions and $R_5$ is an alkylene radical having 2 to 4 carbon atoms, reacting the latter under alkaline conditions with one mol of a nitrogen compound selected from the group consisting of ammonia, a hydrazine having at least one labile hydrogen atom, a primary amine and a secondary amine for each mol of amino groups present in the original polyamine to form a compound having the formula

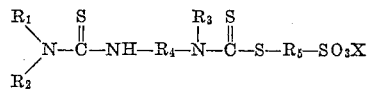

wherein $R_3$, $R_5$, X and $R_4$ have the above definitions and $R_1$ and $R_2$ are the residue of the nitrogen compound, and recovering the latter. The intermediate products do not have to be purified before the next reaction step.

The process of the invention is based upon my discovery that —$R_4$—NH - dithiocarbonyl - S - alkylene-ω-sulfonic acid groups, groups which still contain a labile hydrogen on the nitrogen atom, are unstable under alkaline conditions and decompose to form alkyl mustard oils and salts of mercapto alkane sulfonic acids. If the alkaline cleavage is performed in the presence of a nitrogen containing compound selected from the group consisting of ammonia, primary and secondary amines and a hydrazine, the said nitrogen compound will react with the mustard oils in their nascent state to form a thiourea or thiosemicarbazide grouping. I have also discovered that

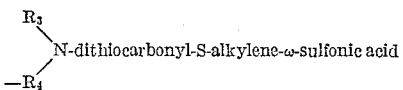

groups, groups that do not have any labile hydrogen atoms on the nitrogen, are very stable in the presence of alkalis at low temperatures and amines. By the novel process of the invention it is possible to produce compounds which contain at least one

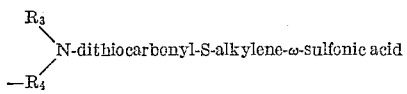

group and at least one thiourea or thiosemicarbazide attached thereto through the alkylene radical $R_4$.

The polyamines which may be used as starting materials for the novel process may be aliphatic, cycloaliphatic and araliphatic amines. Examples of suitable amines are N-ethyl - ethylene - diamine - 1,2, N - methyl - propylene - diamine - 1,3, N-butyl-propylene - diamine - 1,3, N-benzyl - propylene - diamine - 1,3, N-cyclohexyl-butylene - diamine - 1,4, N-tetrahydrofurfuryl - hexamethylene - diamine-1,6, N-methyl - dodecamethylene-diamine-1,12, N-ethyl-octadecylmethylene - diamine-1,18, diethylene triamine, dipropylene-triamine, N-methyl-diethylene-triamine, N' - benzyl - dipropylene - triamine, triethylene-tetramine, tripropylene-tetramine, higher polyethylene polyamines, etc.

The reaction of the polyamine with carbon disulfide and the alkali is usually performed in water but in exceptional cases the concurrent use of a water-miscible organic solvent such as a lower alkanol may be advantageous. The reaction is preferably effected by stirring the aqueous reaction medium at temperature below 50° C. until all the carbon disulfide has reacted and the reaction mixture has become clear. The alkali is preferably an alkali metal hydroxide such as sodium hydroxide.

Examples of suitable alkali metal salts of halo-alkane sulfonate which may be used in the second step of the reaction are bromoethane sodium sulfonate, bromopropane sodium sulfonate, bromobutane sodium sulfonate, etc. However, the use of sultones or the inner acid anhydrides of 1,3- and 1,4-hydroxy alkane sulfonic acids such as 1,3-propane sultone and 1,4-butane sultone are the preferred reactants for the second step since they react so rapidly with the poly-dithiocarbamates to form the esters that the alkalinity of the unreacted dithiocarbamate groups does not cleave the esters formed. When the latter reaction is performed in an aqueous medium, heat is liberated and practically no side reaction products are formed.

The third step of the process is effected by reacting the nitrogen containing compound with the product formed in the second step under alkaline conditions. An alkaline compound such as an alkali metal hydroxide may be used or an excess of the nitrogen containing compound. The reaction can be effected at room temperatures, but if desired, temperatures up to 50° C. may be used.

The primary and secondary amines used in the third step of the process may be aliphatic, cycloaliphatic, araliphatic or heterocyclic, and may be mono or polyamines and the hydrazines may be aliphatic, cycloaliphatic, araliphatic, aromatic, or heterocyclic in nature which contain a labile hydrogen atom. If the said amines are polyamines, the amines will react with more than one molecule of the product formed in the second step of the process.

Examples of suitable amines which may be used in the third step of the process are aliphatic amines such as methylamine, ethylamine, butylamine, dodecylamine, octadecylamine, diethylamine, dibutylamine, ethylene-diamine - 1,2, propylene-diamine - 1,2, hexamethylene-diamine-1,6, octadecamethylene-diamine-1,18, N-methylethylene-diamine-1,2, N-butyl-propylene-diamine-1,3, N-ethyl-hexamethylene-diamine-1,6, N,N'-diethyl-ethylene-diamine-1,2, diethylene-triamine, triethylene-tetramine, etc.; cycloaliphatic amines such as cyclohexylamine and cyclohexyl-diamine-1,4; araliphatic amines such as benzylamine, ethyl-benzylamine, dibenzylamine, N-benzyl-ethylene-diamine-1,4, etc.; and heterocyclic amines such as tetrahydrofurfurylamine, piperidine, morpholine, butyl-tetrahydrofurfurylamine, piperazine, etc.

Examples of suitable hydrazines containing at least one labile hydrogen atom are hydrazine; aliphatic hydrazines such as N-ethyl-hydrazine, N,N-diethyl-hydrazine, etc.; cycloaliphatic amines such as N-cyclohexyl-hydrazines; araliphatic hydrazines such as N-benzyl-hydrazine, N,N - dibenzyl-hydrazine, N,N',N' - tribenzyl-hydrazine; aromatic hydrazines such as phenyl-hydrazine, tolyl-hydrazine, N,N-diphenyl-hydrazine, N-phenyl-N'-benzyl-hydrazine, N-phenyl-N,N'-dibenzyl-hydrazine, etc.; and heterocyclic amines such as N-amino-piperidine, N-aminomorpholine, etc.

The products of the invention usually precipitate out of the reaction solution and are easily recovered. If, after several hours of stirring, the desired products or their salts do not crystallize, they may be separated by adding concentrated sodium chloride solutions during or after the reaction. If the products are unusually soluble in the reaction medium, the reaction mixture may be evaporated to dryness under reduced pressure and the residue extracted with alcohol.

In the following examples there are described several preferred embodiments to illustrate the invention. However, it should be understood that the invention is not intended to be limited to the specific embodiments.

EXAMPLE I

*Preparation of N-Benzyl-Thiocarbamyl-Propylene-Diamino-1,3-N'-Methyl - N' - Dithiocarbonyl - S - Propane-ω-Sodium Sulfonate*

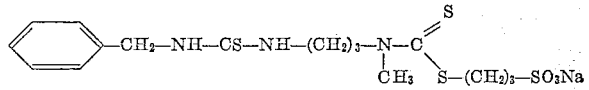

A mixture of 8.8 parts by weight of N-methyl-propylene-diamine-1,3 (0.1 mol), 15.2 parts by weight of carbon disulfide (0.2 mol) and 100 parts by volume of water was vigorously stirred in a three-neck flask provided with a thermometer. After about one-half hour of stirring, 100 parts of volume of 2 N sodium hydroxide (0.2 mol) were added dropwise without taking into consideration the crystalline N-methyl-propylene-diamino-1,3-mono-dithiocarbonate which had separated out in ample quantity, and the mixture was stirred at room temperature until all of the carbon disulfide had entered into the reaction and a clear, pale orange-yellow solution was formed. 24.4 parts by weight (0.2 mol) of pure molten 1,3-propane-sultone were stirred into this solution whereby the temperature rapidly rose to 40–42° C., and this temperature was maintained for about one additional hour by placing a water bath under the flask.

After allowing the reaction mixture to cool, 12.8 parts by weight of benzylamine (0.12 mol) and dropwise 50 parts by volume of 2 N sodium hydroxide (0.1 mol) were added to the reaction mixture. After stirring the resulting mixture at room temperature for one hour, the N-benzyl-thiocarbamyl-propylene diamino-1,3-N'-methyl-N'-dithiocarbonyl-S-propane-ω-sodium sulfonate formed thereby began to separate out. After stirring the mixture for an additional four hours, the precipitate was isolated by vacuum filtration and was obtained in an amount of 34.5 parts by weight, corresponding to a yield of 75% of theory.

The salt, which requires one mol of water of crystallization for formation of good crystals, was recrystallized from twelve times its amount of 93% ethyl alcohol for purposes of purification.

EXAMPLE II

*Preparation of N-Cyclohexylthiocarbamyl-Propylene-Diamino - 1,3 - N'-Methyl-N'-Dithiocarbonyl-S-Propane-ω-Sodium Sulfonate*

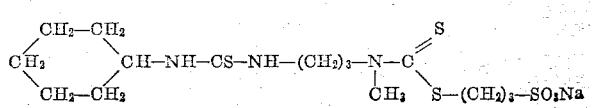

Accompanied by stirring, 11.9 parts by weight of cyclohexylamine (0.12 mol) and subsequently 50 parts by volume of 2N sodium hydroxide were added to an aqueous solution of N-methyl-propylene-diamino-N,N'-bis-dithiocarbonyl-S-propane-ω-sodium sulfonate prepared in a manner analogous to that described in the previous example from N-methyl-propylene-diamino-1,3, carbon disulfide, sodium hydroxide and 1,3-propane-sultone. After six hours of stirring at room temperature and standing overnight, the mixture was made neutral by addition of a few drops of dilute acetic acid, and then 300 parts by volume of a concentrated sodium chloride solution were slowly added accompanied by stirring. The N-cyclohexyl - thiocarbamyl - propylene-diamino-1,3-N'-methyl-N'-dithiocarbonyl-S-propane-ω-sodium sulfonate formed thereby, which was initially oily and later became crystalline and filterable, was separated by vacuum filtration, dried and recrystallized from twenty-five times its amount of alcohol. 24.4 parts by weight of the product were obtained which corresponded to a yield of 54.4% of theory.

If necessary, the salt may be crystallized a second time from 95% alcohol for further purification after again precipitating it with sodium chloride solution from aqueous solution. The salt, which crystallized with 1 mol of water of crystallization, formed a clear aqueous solution having a neutral reaction.

EXAMPLE III

*Preparation of N'',N''-(Piperazino-N,N'-Di-Thiocarbonyl) - Bis-Propylene - Diamino - 1,3 - N'''-Methyl-N'''-Dithiocarbonyl-S-Propane-ω-Sodium Sulfonate*

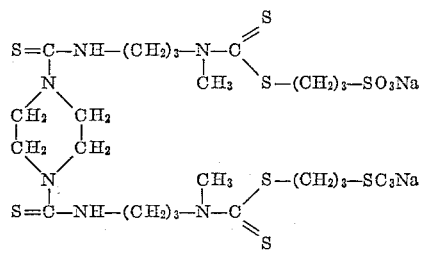

Accompanied by stirring, 9.7 parts by weight of piperazine hexahydrate (0.05 mol) and thereafter, within a period of half an hour, 50 parts by volume of 2 N sodium hydroxide (0.1 mol) were added to an aqueous solution of N - methyl-propylene-diamino-1,3-N,N'-bis-dithiocarbonyl-S-propane-ω-sodium sulfonate prepared in a manner analogous to that described in Example I from 0.1 mol each of N-methyl-propylene-diamine-1,3, carbon disulfide, sodium hydroxide and 1,3-propane-sultone. After stirring for six hours at room temperature, 600 parts by volume of a concentrated aqueous sodium hydroxide solution were added to the reaction mixture and the mixture was allowed to stand overnight to permit crystallization to proceed. On the next day N'',N''-(piperazino-N,N'-dithiocarbonyl) - bis - propylenediamino-1,3-N'''-methyl-N'''-dithiocarbonyl-S-propane-ω-sodium, sulfonate, which had separated out in ample quantity, was separated by vacuum filtration and was purified by dissolving it again in a small amount of water and salting it out with an aqueous sodium chloride solution—preceded by a filtration with activated charcoal. 24.5 parts by weight of the salt were obtained, which corresponded to a yield of 62% of theory.

In its purest form, the salt was obtained with two molecules of water of crystallization by recrystallization from thirty times its amount of a mixture composed of 10 parts of water and 90 parts of alcohol, half of the required amount of alcohol being advantageously added after the salt had dissolved.

EXAMPLE IV

*Preparation of N,N''-Di-Benzylthiocarbamyl-Diethylene-Triamino - N'-Dithiocarbonyl-S-Propane-ω-Sodium Sulfonate*

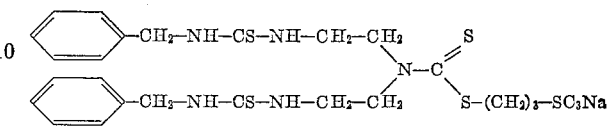

10.3 parts by weight of diethylene-triamine (0.1 mol) and, after about one-half hour, dropwise 150 parts by volume of 2 N sodium hydroxide (0.3 mol) were added at room temperature to a vigorously agitated mixture of 22.8 parts by weight of carbon disulfide (0.3 mol) and 100 parts by volume of water, and the mixture was stirred until all of the carbon disulfide had entered into reaction and a clear solution was formed. 36.6 parts by weight of 1,3-propane-sultone (0.3 mol) were added to this solution, whereby the temperature rapidly rose to about 50° C., and the resulting mixture was maintained at this temperature for about one hour accompanied by stirring. After allowing the mixture to cool, 24.6 parts by weight of benzylamine (0.24 mol) and dropwise 100 parts by volume of 2 N sodium hydroxide (0.2 mol) were introduced and the resulting mixture was stirred for an additional seven hours at room temperature. The next day, the N,N''-di-benzylthiocarbamyl-diethylene-triamino-N'-dithiocarbonyl-S-propane-ω-sodium sulfonate which had precipitated was separated by vacuum filtration and, while still moist, was recrystallized from six times its amount of alcohol. 16.5 parts by weight (corresponding to a yield of 26.2% of theory) of the product were obtained. The salt, which crystallized in the form of coarse needles and, according to analyses, contained one molecule of water of crystallization was very difficultly soluble in water.

EXAMPLE V

*Preparation of N-Phenylthiocarbazinyl-Propylene-Diamino - 1,3 - N'-Methyl-N'-Dithiocarbonyl-S-Propane-ω-Sodium Sulfonate*

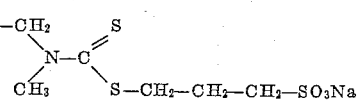

Accompanied by stirring, a solution of 8.8 parts by weight of N-methyl-propylene-diamine-1,3 (0.1 mol) in 50 parts by volume of water was added to a mixture of 15.2 parts by weight of carbon disulfide (0.2 mol) and 50 parts by volume of water in the course of one-half hour. After an additional half hour of stirring, and without regard to the crystalline precipitate formed during that time, 100 parts by volume of 2 N sodium hydroxide (0.2 mol) were added and the mixture was stirred at room temperature until all of the carbon disulfide had entered into reaction and a clear solution was formed. 24.4 parts by weight (0.2 mol) of pure, molten 1,3-propane-sultone were stirred into this solution, whereby the temperature rose to 40 to 42° C., and the mixture was stirred at that temperature for an additional hour.

After allowing the reaction mixture to cool, 10.8 parts by weight of phenyl hydrazine (0.1 mol) and thereafter dropwise 50 parts by volume of 2 N sodium hydroxide (0.1 mol) were added accompanied by stirring. After stirring for six hours more at room temperature, the N-phenyl-thiocarbazinyl-propylene-diamino - 1,3-N'-methyl-N'-dithiocarboynl-S-propane-ω-sodium sulfonate which had precipitated out was filtered off, washed with acetone and dried. 21.5 parts by weight, corresponding to a yield of 46.9% of theory, of the product were obtained. By recrystallization from fifteen times its amount of 90% alcohol, the analytically pure salt containing one mol of water of hydration was obtained.

EXAMPLE VI

*Preparation of N-Benzyl-Thiocarbamyl-Propylene-Diamino-1,3-N'-Methyl-N'Dithiocarbonyl - S - Ethane-ω-Sodium Sulfonate*

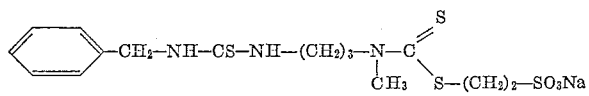

Using a procedure analogous to that described in Example I, 8.8 parts by weight of N-methyl-propylene-diamine-1,3 (0.1 mol) and 15.2 parts by weight of carbon disulfide (0.2 mol) in 100 parts by volume of water were reacted and, after addition of 100 parts by volume of 2 N sodium hydroxide (0.2 mol) the reaction mixture was stirred until all of the carbon disulfide had entered into reaction and a clear solution was formed. To the bis-dithiocarbamate solution thus obtained, 45.8 parts by weight of crystallized sodium bromoethane sulfonate (0.2 mol) were added and the resulting mixture was stirred for a total of four hours—toward the end at 40° C. After allowing the mixture to cool, 11.8 parts by weight of benzylamine (0.11 mol) and 50 parts by volume of 2 N sodium hydroxide (0.1 mol) were added to the reaction mixture and, after stirring it at room temperature for several hours, it was allowed to stand overnight.

The next day 600 parts by volume of a concentrated aqueous sodium chloride solution were slowly added accompanied by stirring, whereby N-benzyl-thiocarbamyl-propylene-diamino-1,3-N' - methyl-N'-dithiocarbonyl-S-ethane-ω-sodium sulfonate separated out in filterable form. The precipitate was separated by vacuum filtration, dried preferably on clay, yielding 33 parts by weight of the raw salt. By recrystallization from 25 times its amount of alcohol, if desired after again reprecipitating it with an aqueous sodium chloride solution, the analytically pure salt may be obtained.

EXAMPLE VII

*N - Pentamethylene-Thiocarbamyl-Ethylene-Diamino-1,2-N'-Benzyl-N'-Dithiocarbonyl-S - Butane-ω-Sodium Sulfonate*

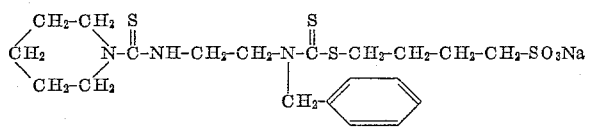

15.0 parts by weight of N-benzyl-ethylene-diamine-1,2 (0.1 mol) were added in small portions, accompanied by vigorous stirring, to a suspension of 15.2 parts by weight of carbon disulfide (0.2 mol) and 150 parts by weight of water. After about one hour, 50 parts by weight of a 16% aqueous sodium hydroxide solution (0.2 mol) was added dropwise at room temperature to the mixture, and the mixture was stirred until all of the carbon disulfide had entered into reaction. Thereafter, 27.2 parts by weight of 1,4-butane sultone (0.2 mol) were added to the reaction mixture, also accompanied by stirring, and after the reaction had subsided the temperature was maintained for about two hours at 40-45° C. At the end of this time 11.1 parts by weight of piperidine (0.13 mol) and 50 additional parts by weight of a 16% aqueous sodium hydroxide solution were added to the reaction mixture and the mixture was stirred for several more hours. The N-pentamethylene-thiocarbamyl - ethylene-diamino-1,2-N'-benzyl-N'-dithiocarbonyl-S-butane-ω-sodium sulfonate formed thereby was isolated and was recrystallized from dilute alcohol for purification.

EXAMPLE VIII

*N - Phenyl-Thiocarbamyl-Dodecylene-Diamino-1,12-N'-Ethyl-N'-Dithiocarbonyl-S-1' - Methyl-Propane-3'-Sodium Sulfonate*

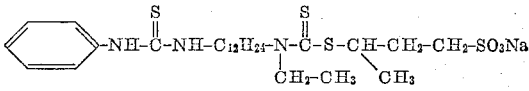

Using 22.8 parts by weight of N-ethyl-dodecylene-diamino-1,12 (0.1 mol), 15.2 parts by weight of carbon disulfide (0.2 mol) and 50 parts by weight of a 16% aqueous sodium hydroxide solution (0.2 mol), the corresponding bisthiocarbamate was prepared in a manner analogous to that described in the preceding example. In order to facilitate the reaction, a portion of the water used in the example may be replaced by alcohol. After all of the carbon disulfide had entered into the reaction, 27.2 parts by weight of 3-methyl-propane-sultone-1,3 were added to the reaction mixture and the mixture was heated for about one hour at 40° C. until all of the sultone had reacted, and then 11.2 parts by weight of aniline (0.12 mol) and 50 additional parts by weight of a 16% aqueous sodium hydroxide solution (0.2 mol) were added to the reaction mixture. The N-phenyl-thiocarbamyl-dodecylene-diamino-1,12-N'-ethyl-N'-dithiocarbonyl - S-1'-methyl propane-3'-sodium sulfonate formed thereby was filtered off and was purified by recrystallization.

Various modifications of the process and products of the invention may be made without departing from the spirit or scope thereof, and it is to be understood that the invention is to be limited only as defined in the appended claims.

I claim:

1. A compound selected from the group consisting of

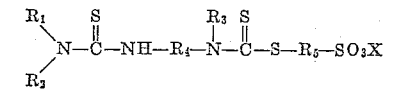

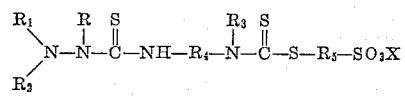

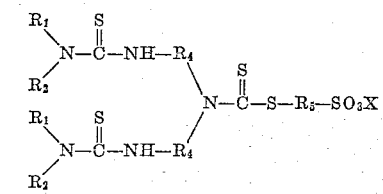

and

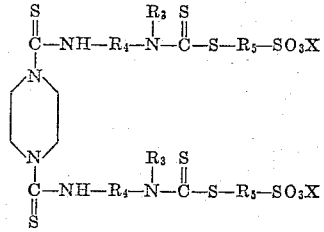

wherein X is selected from the group consisting of hydrogen, an alkali metal and a salt-forming organic base, R, $R_1$ and $R_2$ are selected from the group consisting of hydrogen, alkyl radical having 1 to 18 carbon atoms, cyclohexyl, benzyl, phenyl, a lower alkylamino, cyclohexylamine, diloweralkyl diamino and tri-loweralkyl-triamino with at least one of $R_1$ and $R_2$ being other than hydrogen and when $R_1$ and $R_2$ are taken together with the nitrogen atom form a heterocyclic radical selected from the group consisting of piperidino, morpholino, piperazino, tetrahydrofurfurylamino and lower alkyl-tetrahydrofurfurylamino, $R_3$ is selected from the group consisting of an alkyl radical having 1 to 7 carbon atoms, benzyl and cyclohexyl, $R_4$ is an alkylene radical having 2 to 18 carbon atoms and $R_5$ is an alkylene radical having 2 to 4 carbon atoms.

2. A compound having the formula

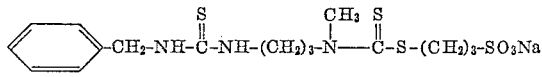

3. A compound having the formula

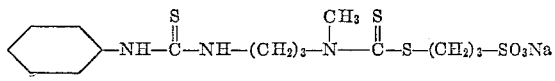

4. A compound having the formula

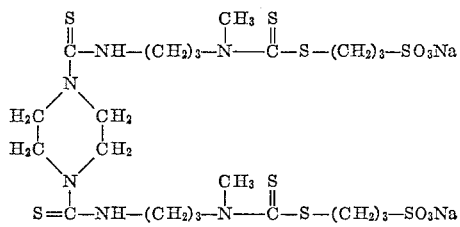

5. A compound having the formula

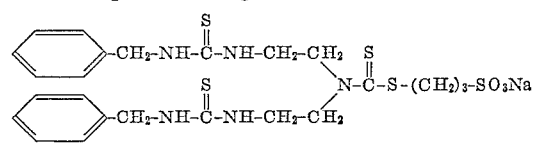

6. A compound having the formula

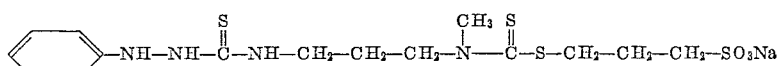

7. A compound having the formula

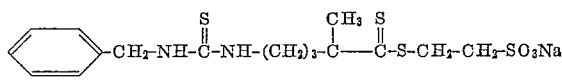

8. A compound having the formula

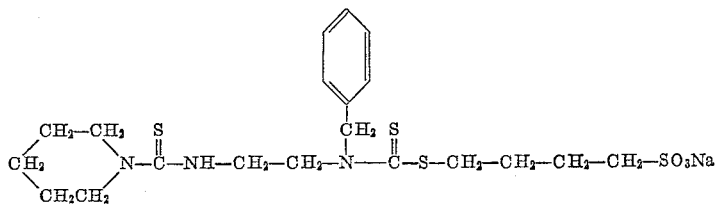

9. A compound having the formula

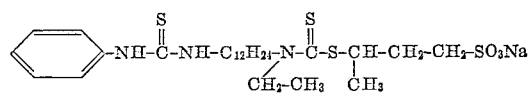

10. A process for the preparation of a compound selected from the group consisting of

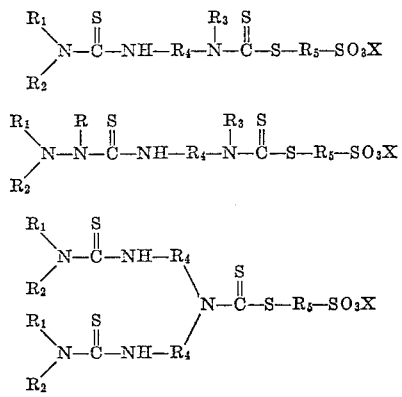

and

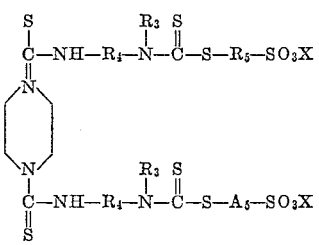

wherein X is selected from the group consisting of hydrogen, an alkali metal and a salt-forming organic base, R, $R_1$ and $R_2$ are selected from the group consisting of hydrogen, alkyl radical having 1 to 18 carbon atoms, cyclohexyl, benzyl, phenyl, a lower alkylamino, cyclohexylamine, diloweralkyl diamino and tri-loweralkyl-triamino with at least one of $R_1$ and $R_2$ being other than hydrogen and when $R_1$ and $R_2$ are taken together with the nitrogen atom form a heterocyclic radical selected from the group consisting of piperidino, morpholino, piperazino, tetrahydrofurfurylamino and lower alkyltetrahydrofurfurylamino, $R_3$ is selected from the group consisting of an alkyl radical having 1 to 7 carbon atoms, benzyl and cyclohexyl, $R_4$ is an alkylene radical having 2 to 18 carbon atoms and $R_5$ is an alkylene radical having 2 to 4 carbon atoms which comprises (A) reacting in an aqueous medium a polyamine having 2 to 3 nitrogen atoms and having a formula selected from the group consisting of $$NH_2-R_4-NH-R_3$$

and $$NH_2-R_4-NH_2-R_4-NH_2$$

wherein $R_3$ and $R_4$ have the above definitions with one mol of carbon disulfide and one mol of alkali for each mol of amino nitrogen to form the corresponding polydithiocarbamate salt, (B) reacting the latter with a member of the group consisting of salts of a halo-alkane sulfonic acid having 2 to 4 carbon atoms and 1,3-alkane sultones and 1,4-alkane sultones having 3 to 4 carbon atoms to form the corresponding alkane polydithiocarbamyl-S-alkylene-ω-sulfonic acid salt and (C) reacting the latter under alkaline conditions with a compound selected from the group consisting of an amine having the formula

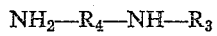

and a hydrazine having the formula

wherein R, $R_1$ and $R_2$ have the above definition to form a compound of the above formulae.

11. The process of claim 10 wherein the carbon disulfide and sodium hydroxide are reacted at temperatures below 50° C. with the polyamine.

12. The process of claim 10 wherein the alkaline agent of the third step is sodium hydroxide.

13. The process of claim 10 wherein the alkaline agent of the third step is an excess of the nitrogen containing compound.

References Cited in the file of this patent
UNITED STATES PATENTS

| | | |
|---|---|---|
| 2,844,584 | Gundel et al. | July 22, 1958 |
| 2,891,065 | Gundel | June 16, 1959 |
| 2,907,786 | Gundel | Oct. 6, 1959 |
| 2,943,972 | Van der Kerk | July 5, 1960 |
| 3,023,215 | Gundel | Feb. 27, 1962 |

UNITED STATES PATENT OFFICE
CERTIFICATE OF CORRECTION

Patent No. 3,122,549            February 25, 1964

Wolfgang Gündel

It is hereby certified that error appears in the above numbered patent requiring correction and that the said Letters Patent should read as corrected below.

Column 6, lines 8 to 14, the right-hand portion of the formula should appear as shown below instead of as in the patent:

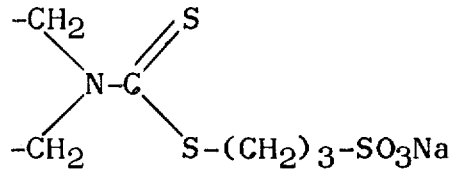

column 9, claim 8, the left-hand portion of the formula should appear as shown below instead of as in the patent:

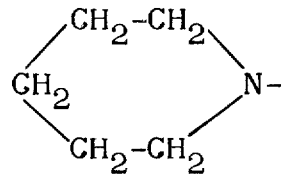

column 10, lines 1 to 10, the lower portion of the formula should appear as shown below instead of as in the patent:

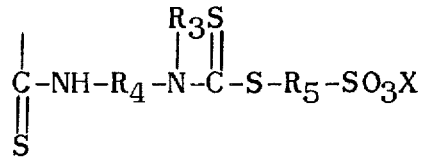

Signed and sealed this 27th day of October 1964.

(SEAL)
Attest:

ERNEST W. SWIDER            EDWARD J. BRENNER
Attesting Officer            Commissioner of Patents